(12) United States Patent
Huotari

(10) Patent No.: US 6,341,221 B1
(45) Date of Patent: Jan. 22, 2002

(54) METHOD OF MANAGING A SUBSCRIBER SERVICE BY AN INTELLIGENT NETWORK SERVICE

(75) Inventor: Seppo Huotari, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/702,495

(22) Filed: Oct. 31, 2000

Related U.S. Application Data

(63) Continuation of application No. PCT/FI99/00430, filed on May 18, 1999.

(30) Foreign Application Priority Data

May 19, 1998 (FI) .................................................. 981113

(51) Int. Cl.$^7$ ............................. H04M 3/42; H04Q 7/20
(52) U.S. Cl. ...................... 455/414; 455/433; 455/560
(58) Field of Search .............................. 455/433, 422, 455/560, 414, 418, 432; 379/207, 201, 219, 220, 229, 230

(56) References Cited

U.S. PATENT DOCUMENTS

| 5,379,383 A | 1/1995 | Yunoki |
| 6,044,264 A | 3/2000 | Huotari et al. |

FOREIGN PATENT DOCUMENTS

| EP | 0 715 473 | 6/1996 |
| EP | 0 732 861 | 9/1996 |
| FI | 98971 | 5/1996 |
| WO | WO 95/20299 | 7/1995 |
| WO | WO 95/26114 | 9/1995 |
| WO | WO 96/34502 | 10/1996 |
| WO | WO 97/18680 | 5/1997 |
| WO | WO 97/27713 | 7/1997 |

*Primary Examiner*—Nguyen T. Vo
(74) *Attorney, Agent, or Firm*—Altera Law Group, LLC

(57) ABSTRACT

A method of managing a subscriber service by an intelligent network service in a telecommunications system, which comprises a mobile communication network including a home location register and at least one switching center; and an intelligent network including a service control point and a number of network elements with a service switching function. An intelligent network service is inserted into the service control point, the intelligent network service comprising a management function which is activated in response to the fact that a detection point having a predetermined trigger condition is encountered. The home location register comprises a service switching function, or at least the part of it essential for processing a detection point. An intelligent network service detection point whose trigger condition includes a condition that a situation should exist in which the mobile subscriber wants to manage the subscriber service or the intelligent network service related to it himself. When the home location register detects that the predetermined trigger condition is fulfilled, it sends an initial message to the service control point to activate the management function. The service control point sends the necessary intelligent network service instructions to the home location register.

4 Claims, 3 Drawing Sheets

METHOD OF MANAGING A SUBSCRIBER SERVICE BY AN INTELLIGENT NETWORK SERVICE

This Appln is a continuation of PCT/FI99/00430 filed May 18, 1999.

BACKGROUND OF THE INVENTION

The invention relates to management of intelligent network services in a mobile communication network, particularly to management of supplementary subscriber services which include an intelligent network service. The invention also relates to the home location register of the mobile communication network.

The intelligent network IN can be used for offering a large number of different services to a subscriber in a data communication network, e.g. in a fixed network or mobile communication network. These services include a virtual private network VPN which enables use of short numbers between the subscribers in the local network, and a personal number where the intelligent network reroutes calls made to the personal number as defined by the subscriber. An example of such an intelligent network is described in Q-1200 series of ITU-T recommendations. Recommendations Q-1210 to Q-1219 define a set of features called CS-1 (Capability Set 1) and recommendations Q-1220 to Q-1229 define capability set CS-2. The invention and its background will be explained using the terms according to recommendation ETS 300 374-1 CoreINAP, but the invention is also applicable to intelligent networks implemented according to other intelligent network standards. In this application the term "intelligent network recommendation" means the abovementioned recommendation ETS 300 374-1. The relevant section of the recommendation is mainly the one defining intelligent network protocols.

The basic call state model BCSM defined in connection with the intelligent network describes different phases of call control and includes the points when call control can be interrupted to activate an intelligent network service. The BCSM recognizes the detection points in the call and connection process where the service logic entities of the intelligent network can interact with basic call and connection management features.

FIG. 1 illustrates structure of a prior art intelligent network. The intelligent network architecture comprises one or more service control functions SCF. The apparatus or network element which carries out the tasks assigned to the SCF is called a service control point SCP. In this application the SCF and the SCP are equal and, in the following, the name SCP is generally used. The SCP gives call setup instructions to the switching centre, or the switching centre may ask for call setup instructions from the SCP. If at some point of call setup it is noted, for example, that the subscriber B's line is busy, the call can be routed to an alternative number. FIG. 1 also illustrates other intelligent network elements relevant to understanding the invention, such as call control function CCF, which comprises high-level call processing functions of the switching centre, such as establishment and release of transmission connections. A service data function SDF and a service data point SDP form a database which includes subscriber and/or service specific information. Specialised resource function SRF is an interface for the network mechanisms related to interaction with the subscriber. It may be related to intelligent peripherals IP which include more developed speech processing functions than the switching centres usually do.

Service switching function SSF is an interface between the call control function CCF and the service control function SCF. The network element performing the SSF function is called a service switching point SSP. An intelligent network service is produced so that the service switching point SSP asks for instructions from the service control point SCP by means of messages to be transmitted over the SSP/SCP interface when detection points related to the services are encountered. In intelligent network terminology these messages are called operations. In connection with an intelligent network service a service program is activated in the service control point SCP, and the function of the program determines the operations the SCP transmits to the SSP at each call stage.

FIG. 2 illustrates function of a prior art intelligent network at detection points. In step 2-1 the SSP transmits an InitialDP operation (IDP) to the SCP, the operation including the information needed for call setup. This is followed by arming of detection points in the SSP. In step 2-2 the SCP sends a REQUESTREPORTBCSMEVENT operation to the SSP, which includes information on the instances of encountering detection points the SSP should report to the SCP. Next, in step 2-3, the SCP typically sends charging and/or interaction operations, such as FURNISHCHARGINGINFORMATION (save charging information related to the intelligent network service) or PLAYANNOUNCEMENT (give an announcement related to the intelligent network to the subscriber). In step 2-4 the SCP sends routing instructions to the SSP, such as COLLECTINFORMATION (collection of selection information from the subscriber), CONNECT (route the call to a new number), CONTINUE (continue call setup according to the same information) or RELEASECALL (release the connection). In intelligent network recommendations call setup is divided into certain rough phases called Point-In-Call (PIC). For example, it may be defined that in response to the COLLECTINFORMATIONOPERATION the SSP should continue call setup from phase PIC 2 and in response to the CONNECT operation it should continue call setup from phase PIC 3, etc.

In intelligent network architectures the defined detection points constitute the primary mechanism for reporting different events. The events of FIG. 2 described above are related to a detection point which is called a Trigger Detection Point (TDP). The SSP may make an initial inquiry to the SCP in connection with such a TDP detection point and receive information for call setup in it. Event Detection Points (EDP) represent the other type of detection points. Step 2-6 of FIG. 2 illustrates a moment when such an EDP detection point is encountered during call setup. The SSP reports that the detection point was encountered to the SCP, which in step 2-8 sends further call setup instructions to the SSP.

A problem related to prior art solutions utilizing the intelligent network in connection with a mobile communication network is e.g. that cooperation between the subscriber's normal supplementary services and intelligent network services is poor. In practice this means that subscriber services do not function in all situations, e.g. it is typically impossible to register call forwarding by means of a short number because cooperation between the call forwarding service and the short number service is poor.

BRIEF DESCRIPTION OF THE INVENTION

An object of the invention is to provide a method and an apparatus implementing the method to manage an intelligent network service substantially in the same way in the home network of a mobile station and in a visited network. The objects of the invention are achieved with a method and system which are characterized by what is disclosed in the independent claims. Preferred embodiments of the invention are disclosed in the dependent claims.

The invention is based on the idea that an intelligent network and a mobile communication network are combined utilizing the home location register of the mobile communication network. The home location register of the mobile communication network is supplemented so that it comprises the functionality of a service switching point, or at least the part of it essential for processing detection points. The home location register is armed with a subscriber-specific trigger point of intelligent network service which is related to supplementary service management procedures.

It is preferable to restrict the subscriber's rights so that the subscriber may only manage supplementary services and the operator is responsible for management of basic services.

An advantage of the method and system of the invention is that the intelligent network and the mobile communication network can be combined flexibly, which means improved service management to the subscriber. This provides a clear competitive advantage for the operator. Since an intelligent network service is triggered in connection with the inquiry made to the home location register, the functionality of the invention is available regardless of whether the mobile station is within the area of its own network or another network. Even though the intelligent service trigger point included in the home location register is subscriber-specific, the calculated increase of memory need per subscriber is very small, approximately 10 to 20 bytes.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
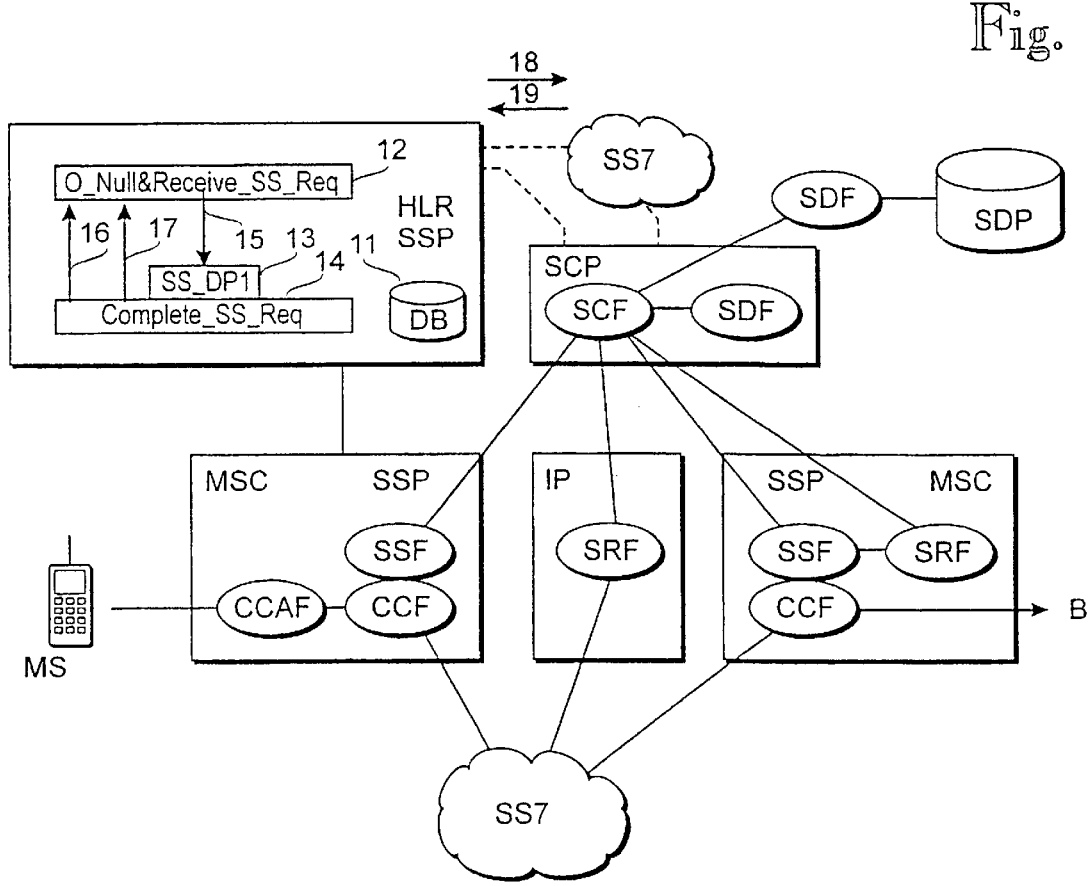
FIG. 1 illustrates parts of a mobile communication network and intelligent network that are relevant to the invention.
Figure 2:
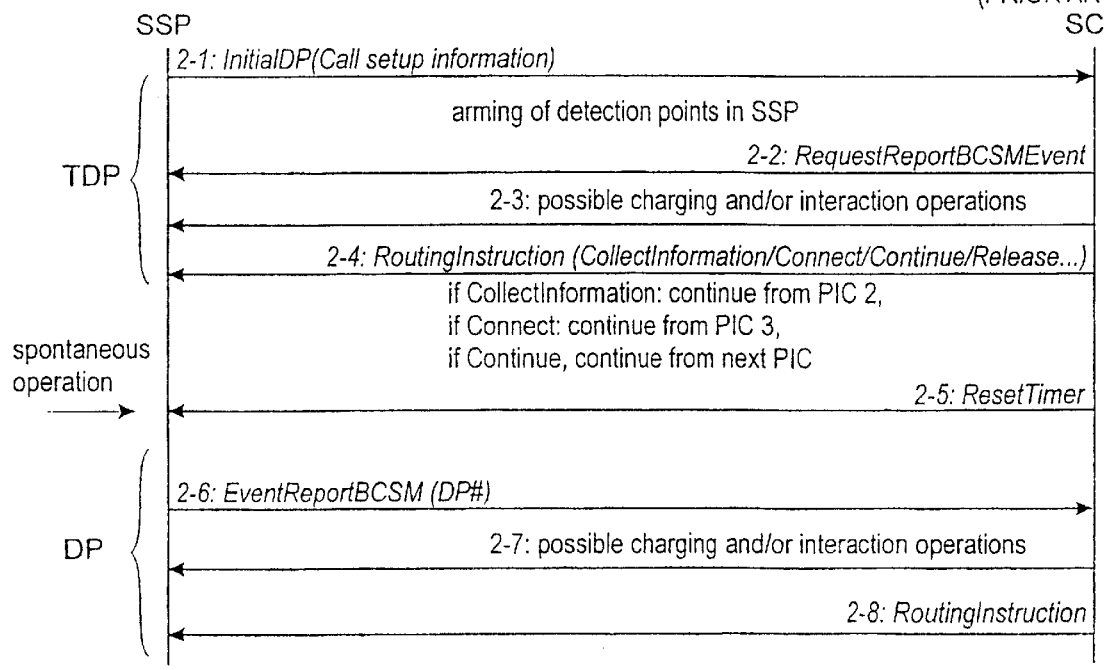
FIG. 2 illustrates function of a prior art intelligent network at detection points.

FIG. 1 illustrates the home location register of a mobile communication network supplemented according to the invention. In this case the home location register HLR comprises the SSP function, at least the part of it needed to process detection points. A connection is established from the home location register to a service control point SCP. This connection can be established using any technology known per se, e.g. common channel signalling.

Information on the supplementary services the subscriber can manage himself through his terminal is added to the subscriber data 11 in the home location register. The home location register is armed with the detection point of the intelligent network service (or the management routine of the service) if the supplementary service has been added to the subscriber concerned. In intelligent network standards processing of detection points is usually illustrated using a state chart. Such a state chart is illustrated in connection with the home location register HLR. The chart comprises a base state 12, which according to the intelligent network standards has been named O_Null&Receive_SS_Req. This state is in fact an idle state in which a supplementary service management request is waited for. A detection point 13 called SS_DP1 (detection point 1 of supplementary service) is encountered through transition 15, after which we move to state 14, called Complete_SS_Req where an initial message IDP is formed for the service control point SCP. We return to the base state via transitions 16 and 17. Transition 16 is a normal transition and transition 17 is related to error situations (e.g. the SCP does not answer). Arrow 18 denotes the initial message IDP of the intelligent network service to be transmitted to the SCP and arrow 19 denotes the response sent by the SCP, i.e. instructions for the intelligent network service. These are explained more closely in connection with FIGS. 3A to 4.

The detection point 13 is encountered, i.e. its trigger conditions are fulfilled, if the transition related to the supplementary service is acceptable. (Several conditions relating e.g. to congestion, compatibility of services and subscriber roaming have been defined for transitions in the intelligent network standards.) A trigger condition may be related to a specific supplementary service, such as Call Forwarding Unconditional CFU. Alternatively, it may be related to a group of supplementary services, such as Call Forwarding services CF.

Figure 3A:
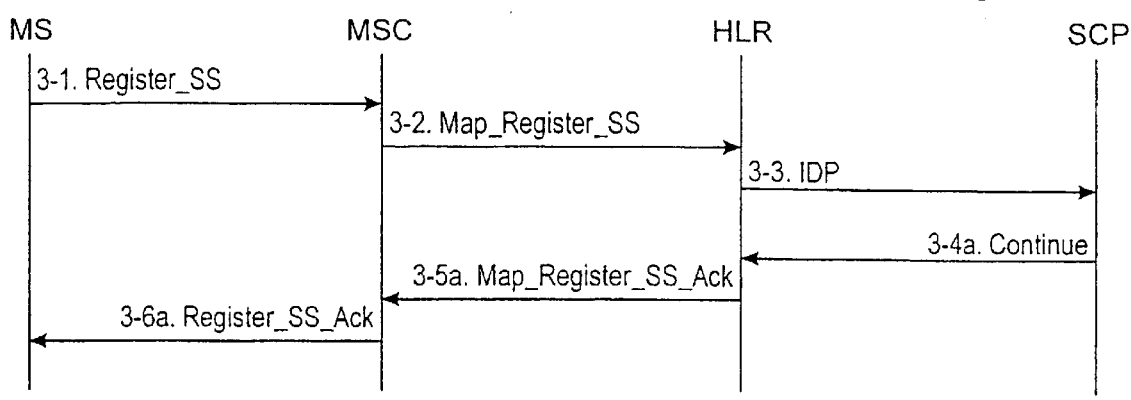
FIGS. 3a to 3c are signalling charts illustrating the invention.

FIG. 3A is a signalling chart illustrating the invention. We take as a simple example call forwarding. In step 3-1 the subscriber, i.e. the user of a mobile station MS, wants to change the settings of call forwarding. In the GSM system call forwarding to number 123456 can be implemented by keying in character string *21*#123456#. (In some mobile stations call forwarding can also be defined by means of the menu.) In step 3-2 the switching centre MSC detects that the mobile MS user wants to change the state of the supplementary service and informs the home location register HLR of this by sending message MAP_REGISTERSS. In step 3-3 the home location register notes that the trigger condition of the supplementary service in question is fulfilled and in response to this the home location register sends an IDP message to the service detection point SCP to activate the management routine of the service in question. In this case the message includes, as a parameter, the number to which calls are to be forwarded.

We assume that in step 3-4a the SCP continues by sending a CONTINUE operation. The home location register acts as if there had been no trigger and sends acknowledgement MAP_REGISTERSS_ACK to the switching centre MSC1 in step 3-5a. In step 3-6a the switching centre MSC1 sends an acknowledgement to the mobile station MS.

Figure 3B:
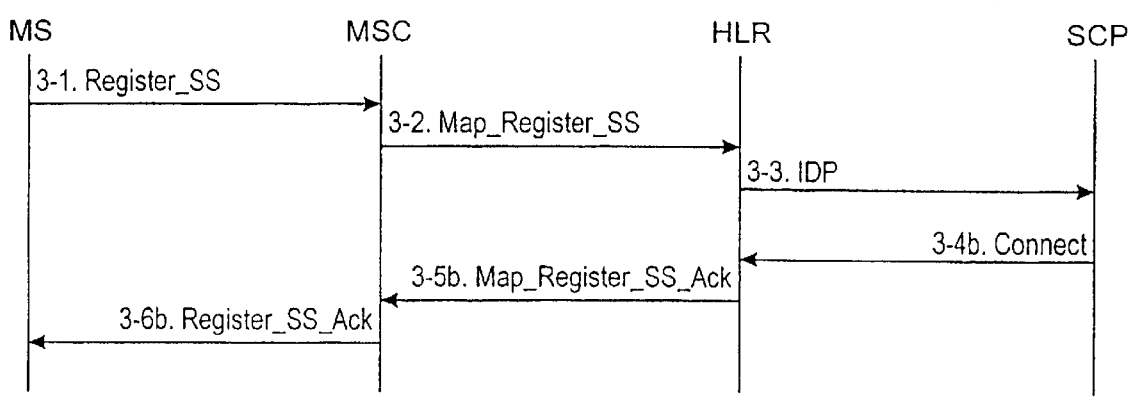

FIG. 3B illustrates an event which begins in the same way as that of FIG. 3A, steps 3-1 . . . 3-3. In this case we assume that the SCP continues by sending a CONNECT operation in step 3-4b. The SCP may have accepted the number which has been given by the mobile user and to which calls are to be forwarded. The SCP may also change this number, e.g. change a short number into an ISDN number, etc. In response to the CONNECT operation the home location register may check the type of the new number. If the type of number is 'international' (INT), the home location register performs the same checks on this number as on the number given by the subscriber, e.g. different instances of barring, etc. If the type of number is not 'international' (INT) but some other type, e.g. 'unknown', the home location register does not perform its checks but relies on the function of the SCP service logic. If the possible checks are passed, the number is stored in the database of the home location register and a positive acknowledgement is sent to the switching centre MSC1 and the subscriber, as was explained in the case of FIG. 3A, steps 3-5*a* and 3-6*a*. If one of the possible checks is not passed, a negative acknowledgement is sent to the switching centre MSC1 and the subscriber, as will be explained in the case of FIG. 3C, steps 3-5*c* and 3-6*c*.

Figure 3C:
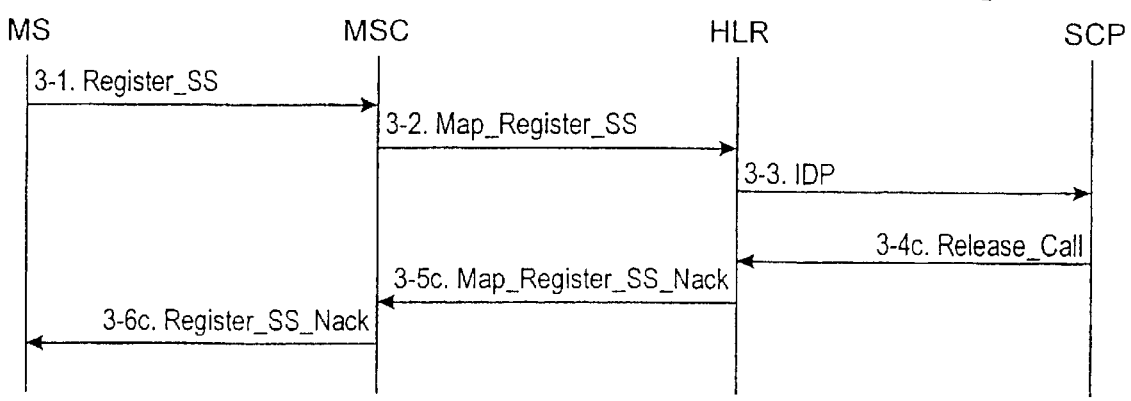

FIG. 3C also illustrates an event beginning in the same way as that of FIG. 3A, steps 3-1 . . . 3-3. In this case it is assumed that the SCP notices itself that barring (operator barring) is related to the number given by the subscriber In step 3-4*c* the SCP rejects the request and indicates rejection e.g. by sending a RELEASECALL operation to the switching centre MSC1.

In a further alternative case the SCP answers with a protocol error message (IPD_error_abort, or the like), or the SCP does not answer at all. In that case the HLR may conclude itself on the basis of the parameter set for it whether to accept or reject the subscriber's request. If the request is rejected, a system error message may be given as a reason for rejection to the subscriber.

By inserting the supplementary service detection point into the home location register the supplementary service can be made available regardless of whether the mobile user is in the area of his own network or another network. Increase of the memory need in the home location register is very moderate because only information on the existence of a detection point is included in the data of the subscriber who has ordered supplementary services. The memory need is 10 to 20 bytes per supplementary service and user.

According to a preferred embodiment, the home location register is supplemented with a function supporting implementation of supplementary services, particularly in respect of service interaction. Checks made by the home location register that are particularly suitable include Operator Determined Barring ODB. Barring of Supplementary Services management BASS or Barring of Registration of any forwarded-to-number BR, for example, may be defined in the subscriber data. The home location register can recognize such situations itself and omit the inquiry to the SCP. This decreases signalling load between the home location register and the service control point.

According to another preferred embodiment, the home location register is supplemented with a function supporting the supplementary service in question. In other words, the home location register participates in producing the intelligent network service concerned. We use call forwarding as an example in this case, too. If a call is to be forwarded to a number whose type is not 'international', the home location register cannot send the data of the subscriber who has ordered the service in question to the visited mobile communication network, unless the switching centre of this network is able to interpret the number. It is therefore preferable that the home location register filter off such instances of call forwarding when it detects that the subscriber roams in a foreign network. Such problematic networks can be defined in the parameters of the home location network.

Figure 4:
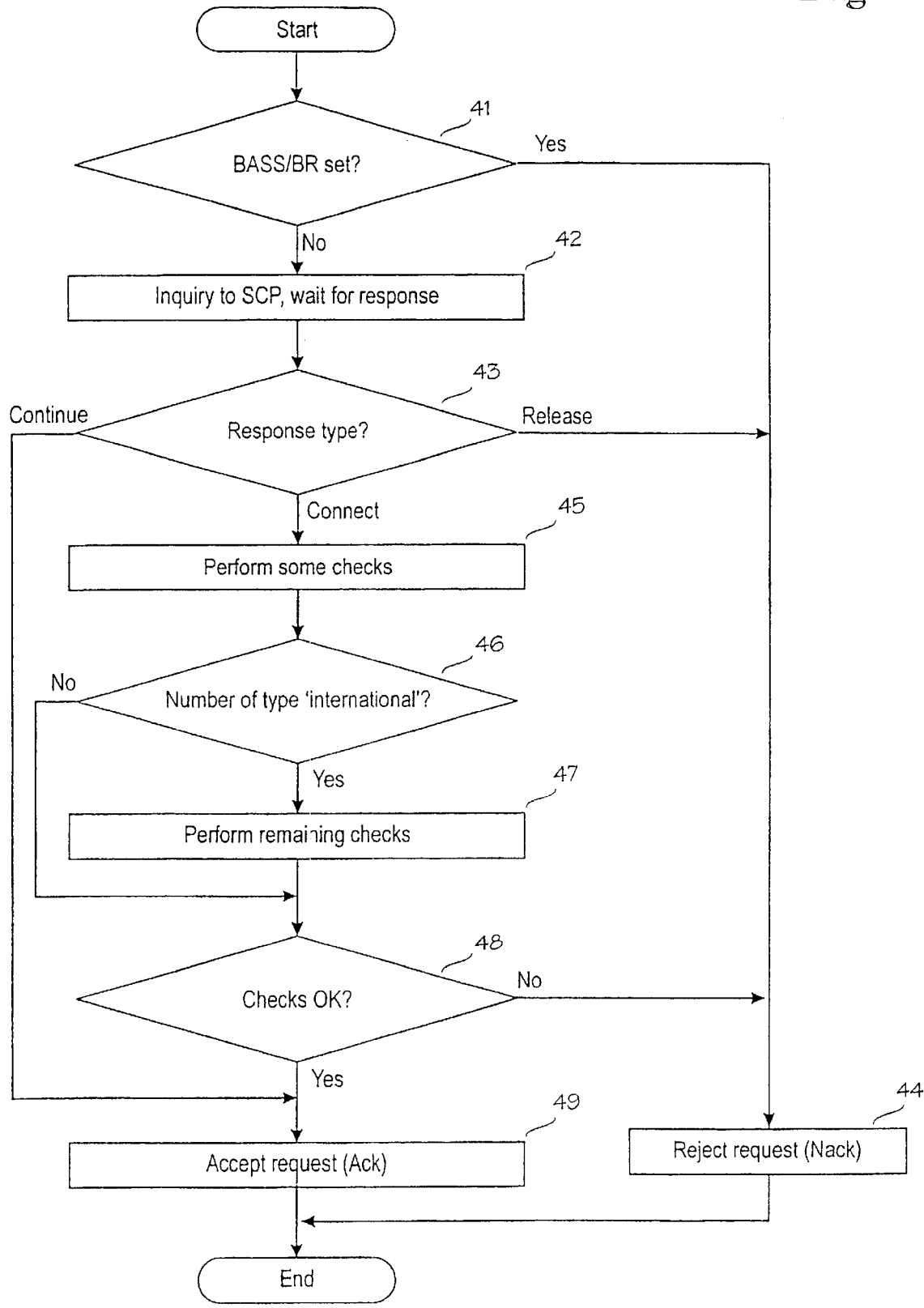
FIG. 4 is a flow chart illustrating an application (call forwarding) of the invention.

The flow chart in FIG. 4 illustrates implementation of call forwarding by means of the invention and its preferred embodiments. FIG. 4 illustrates what happens in the home location register as it receives the mobile user's request for intelligent network service management. In step 41 it is checked whether instances of operator determined barring have been defined for the subscriber, such as the BASS and BR described above. If this is the case, the subscriber's request is rejected (step 44) and a negative acknowledgement is sent to the subscriber (as in FIG. 3C except that the inquiry to the SCP has been omitted). In step 42 an IDP inquiry is sent to the SCP and the SCP's response is waited for. In step 43 the response sent by the SCP is examined. If the response is RELEASECALL, we move to step 44 where the subscriber's request is rejected. If the response is CONTINUE, we move to step 49 where a positive acknowledgement is sent to the subscriber (as in FIG. 3B).

If the SCP's response is CONNECT, we move to steps 45 to 48 where certain checks are performed on the basis of the number given by the SCP. Some checks are performed regardless of the type of number. These include BAOC (Barring of All Outgoing Calls), BAIC (Barring of All Incoming Calls), BIC-Roam (Barring of Incoming Calls when Roaming outside the home PLMN country), BIRZ (Barring of Incoming Calls when Roaming outside the Zone home PLMN country) and CF interactions (such as CFU, Call Forwarding Unconditional).

Some checks are performed only if the type of number is 'international'. (For example, the subscriber have international call barring in which case it must be checked whether call forwarding indicates an international number.) These checks are performed in step 47. If it is found out in step 48 that all checks have been passed, a positive acknowledgement is sent to the subscriber in step 49. (Naturally even one check which is not passed causes transition to step 49, and thus it is not necessary to perform the remaining checks.)

It is obvious to a person skilled in the art that as the technology develops the inventive concept may be implemented in various ways. Thus the invention and its embodiments are not limited to the examples described above, but they may vary within the scope of the claims.

What is claimed is:

1. A method of managing a subscriber service by an intelligent network service in a telecommunications system, the method comprising:

communicating in a mobile communication network, wherein the network includes a home location register, at least one switching center, and an intelligent network that includes a service control point and a number of network elements having a service switching function;

processing a detection point by at least part of a service switching function of the home location register;

inserting an intelligent network service related to a subscriber service into the service control point, the intelligent network service including a management function which is activated in response to encountering a detection point having a predetermined trigger condition, wherein the trigger condition includes when a mobile subscriber wants to manage a subscriber service or an intelligent network service related to the mobile subscriber;

inserting the predetermined detection point into the home location register, wherein in response to detecting fulfillment of the predetermined trigger condition, the home location register sends an initial message to the service control point to activate the management function; and in response to the initial message, the service control point sending intelligent network service instructions to the home location register.

2. The method according to claim 1, wherein a set of predetermined checks is related to the management function of the intelligent network service and the home location register performs at least some of these checks.

3. The method according to claim 2, wherein some of said checks are made before sending the initial message to the service control point and the initial message is sent only if the checks preceding the initial message are passed.

4. A home location register for a mobile communication system, the home location register comprising:
- a database for storing mobile subscriber data;
- a service switching function, or at least the part of the service switching function essential for processing a detection point;
- an intelligent network service detection point having a trigger condition which wherein the trigger condition includes when a mobile subscriber wants to manage a subscriber service or an intelligent network service related to the mobile subscriber;
- means for sending an initial message to a service control point to activate the management function in response to the fact that the home location register detects that the predetermined trigger condition is fulfilled; and
- means for receiving a response related to the initial message from the service control point and processing the response and sending it to the mobile subscriber.

* * * * *